United States Patent
Goebel et al.

[11] 3,762,036
[45] Oct. 2, 1973

[54] MACHINE TOOL WITH TOOL EXCHANGING MECHANISM

[75] Inventors: Hellmut Goebel, Reutlingen; Ernst Raiser, Rommelsbach, both of Germany

[73] Assignee: BW-Weber Verwaltungsgesellschaft mit beschrankter Haftung, Reutlingen, Germany

[22] Filed: May 19, 1971

[21] Appl. No.: 144,737

[30] Foreign Application Priority Data
May 29, 1970 Germany.................. P 20 26 221.9
Dec. 4, 1970 Germany.................. P 20 59 688.7

[52] U.S. Cl.............................. 29/568, 408/35
[51] Int. Cl............................... B23q 3/157
[58] Field of Search........... 29/568, 26 A; 408/35

[56] References Cited
UNITED STATES PATENTS

| | | | |
|---|---|---|---|
| 2,323,010 | 6/1943 | Conradson.................... | 29/568 X |
| 3,225,439 | 12/1965 | Perry et al..................... | 29/568 |
| 3,286,595 | 11/1966 | Wollenhaupt.................. | 29/568 X |
| 3,509,619 | 5/1970 | Lipp............................. | 29/568 |
| 3,555,963 | 1/1971 | Evans........................... | 29/26 A |
| 3,640,634 | 2/1972 | Oeckl........................... | 29/568 X |
| 3,650,018 | 3/1972 | Perry et al..................... | 29/568 |

FOREIGN PATENTS OR APPLICATIONS
1,803,989 6/1969 Germany.......................... 408/35

Primary Examiner—Andrew R. Juhasz
Assistant Examiner—Z. R. Bilinsky
Attorney—Arthur O. Klein

[57] ABSTRACT

A tool exchanging mechanism for a machine tool having a reciprocating headstock and a tool head mounted on the headstock and adapted to be alternately turned to different positions about an axis of 45° to the direction of movement of the headstock. The tool head is provided with at least two tool supports on which multiple-spindle heads or individual tools may be removably mounted. When the tool head is turned so that one tool support and a multiple-spindle head or individual tool is in its working position in which it is movable by the headstock in the direction of movement of the latter and the tool or tools thereon carry out their work and are then returned, the other tool support is in its exchanging position at a right angle to the working position, or vice versa. In this exchanging position, a multiple-spindle head or an individual tool may therefore be exchanged for another during the period in which the headstock with another spindle head or individual tool in its working position carries out its working and return strokes. This tool exchanging mechanism preferably further comprises one or two separate magazines for a plurality of multiple-spindle heads and/or individual tools from which the next desired spindle head or tool may be selected and exchanged for a previously used spindle head or tool which is in the exchanging position of the respective tool support on the tool head.

17 Claims, 14 Drawing Figures

Fig. 1.

Inventors:
Hellmuth GOEBEL
Ernst RAISER
by: Arthur O. Klein
Attorney

Inventors:
Hellmuth GOEBEL
Ernst RAISER
by: Arthur O. Klein
Attorney

MACHINE TOOL WITH TOOL EXCHANGING MECHANISM

The present invention relates to a machine which is provided with a headstock and a tool exchanging mechanism, and it is the principal object of the invention to provide such a mechanism in the form of a unit which permits a multiple-spindle head or an individual tool to be exchanged on the headstock for another within the shortest possible length of time and preferably automatically.

One feature of the invention for attaining this object consists in providing the headstock of a machine tool with a tool head on which at least two tool supports, for example, for multiple-spindle heads or individual tools, are provided and which is adapted to be turned on the headstock about an axis which is equally inclined to the axes of the tool supports, and in providing suitable means for turning the tool head about its axis to a number of positions in accordance with the number of tool supports and for locking the tool head in either of these positions in which one of the tool supports is in its working position in which the tools on the multiple-spindle head or the individual tool may carry out their work by being moved by the headstock, while another tool support is at the same time in an exchanging position in which the multiple-spindle head or the individual tool may be exchanged for another. Thus, when a new spindle head or individual tool has already been moved to and mounted on a tool support which is in its exchanging position, this spindlehead or individual tool may be quickly exchanged for another which until this time was located in its working position by simply turning the toolhead about its axis. Thus, the spindlehead or individual tool which was at first located in its exchanging position will now be in its working position, while the spindlehead or tool which was first located in its working position will now be in its exchanging position. Since this exchange may be carried out very quickly by merely turning the toolhead about its axis, the successive operations on one or different workpieces may be carried out practically without interruptions, especially also since according to another feature of the invention the previously used spindlehead or individual tool after being moved to the exchanging position of the toolhead and the respective tool support thereof may be exchanged for a further new spindlehead or individual tool very quickly and preferably during the period in which the spindlehead or tool which is then in its working position is being moved by the headstock so as to carry out its work.

According to one preferred embodiment of the invention, in which the toolhead is only intended to carry two or more multiple-spindleheads, the spindlehead which is located in the exchanging position of toolhead and one of its tool supports may be exchanged for a new spindlehead from a magazine which contains a plurality of spindleheads. This exchange operation may be carried out while the other spindlehead which is in the working position of the toolhead carries out its work. Another feature of this embodiment of the invention consists in providing a guide element which connects the magazine to the tool support which is located in the exchanging position. This guide element comprises two pairs of rail sections one pair of which is telescopically slidable into and along the other pair and one pair of which is rigidly connected to the magazine, while the other pair is rigidly connected to the headstock. Therefore, in any position of the headstock this guide element will connect the magazine to the respective tool support which is in its exchanging position. Consequently, while one spindle head is in its working position and the headstock carries out its working and return strokes, the other spindlehead which is then in its exchanging position may be exchanged for another spindlehead from the magazine. The operation of exchanging the spindleheads is therefore carried out almost entirely during the working and return strokes of the headstock and only requires additionally the short length of time which is necessary for turning the toolhead about its axis so as to reverse the positions of the two spindleheads on the toolhead so that the spindlehead which has just been returned to its original position by the headstock after its tools have completed their work is moved to the exchanging position for being exchanged for another spindlehead from the magazine, while the other spindlehead on the toolhead is moved by the latter from its exchanging position to its working position, whereupon the headstock may carry out the next working stroke.

Since especially multiple-spindleheads are relatively large and heavy objects, it is another feature of the invention to provide a shifting mechanism which is adapted to retract such a spindlehead from the tool support which is located in the exchanging position of the toolhead and upon an empty carriage of the magazine and to shift a new spindlehead from the magazine into and upon this tool support. Because of the size and weight of a multiple-spindlehead including its tools it is necessary to carry out such an exchange operation very carefully so that during this operation no shocks or impacts will be exerted upon the toolhead which would be transmitted by the latter to the other spindlehead and the tools thereon with the result that the quality of the work which is carried out during this time by these tools might be seriously impaired. In order to carry out such an exchange of spindleheads without any impact upon the toolhead, the invention provides a sensing device impact determines or "senses" the final position of the slide member of the shifting mechanism during the insertion of a new multiple-spindlehead into the tool support which is located in the exchanging position. The final position of this slide member will therefore not be determined by the sudden engagement of any part with a stationary stop member but by controlling the operation of the driving means of the shifting mechanism by means of this sensing device. According to a preferred embodiment of the invention, this sensing device comprises at least two switches which are actuated by cam surfaces on the slide member which are inclined in opposite directions to each other as seen in the direction of movement of the slide member and are adapted to permit the slide member to oscillate relative to its proper final position unitl it arrives in this position and is stopped accurately at the desired point.

If the tool supports on the toolhead are only designed for receiving multiple-spindlheads, it sometimes occurs that the machine tool cannot be used economically, for example, because the individual spindles of a multiple-spindlehead and their bearing means take up too much space to permit the tools on such a spindlehead to work simultaneously on very closely adjacent parts of a workpiece, for example, to drill closely adjacent holes simultaneously. Furthermore, even if in successive series of workpieces there may be only some points on which certain work is to be carried out by the tools of a multiple-spindlehead and which points differ from each other, for example, by being spaced at different distances from each other in the different series, such a spindlehead must be rebuilt, readjusted or exchanged for another. For employing a machine tool more economically, it is a feature of another preferred embodiment of the invention to provide the toolhead with at least four tool supports, at least two of which are adapted to receive multiple-spindleheads, while at least two other tool supports of this toolhead are adapted to receive individual tools. Such a single toolhead therefore permits individual tools and multiple-spindleheads to be used alternately, in place of or in successive combination with each other. If the points on a workpiece on which certain work is to be carried out are located more closely adjacent to each other than the tools of a multiple-spindlehead can be spaced, those points of the workpiece which cannot be reached by the tools of the multiple-spindlehead may therefore be machined by the individual tool or tools without requiring any remounting or adjustment of the position of the workpiece. Similarly, if some of the points of successive workpieces or series of workpieces on which certain work has to be carried out differ from each other, some of the work which is identical in the two workpieces or series may be carried out by the same multiple-spindlehead, while the changed points may be machined by the individual tools which are adjusted accordingly. Finally, if in certain cases it would be uneconomical to employ any multiple-spindleheads, it is also possible to carry out all work on one workpiece or on different workpieces or successive series of different workpieces by only inserting individual tools into the toolhead and exchanging them for each other on this toolhead. It is another important advantage of the invention which may already be evident from the above description that the same workpiece may be machined alternately and in any desired order of succession either by the tools on multiple-spindleheads or by individual tools, and all by means of the same toolhead.

Although it would be possible to supply multiple spindleheads as well as individual tools to the toolhead, a preferred embodiment of the invention provides a separate magazine for the multiple spindleheads and another magazine for the individual tools and means for exchanging the spindlehead or individual tool on the respective tool support which the toolhead carries in its exchanging position by moving it to and replacing it from the respective magazine. These exchange operations between either of these magazines and the toolhead may be carried out very quickly. Thus, while one tool support of the toolhead with a single tool thereon is located in its working position, and the tool is carrying out its work on a workpiece, the other tool support for a single tool is in its exchanging position and this single tool may be exchanged for a new single tool from the single-tool magazine within the period in which the first single tool carries out its work.

Another feature of the invention consists in mounting the support of the single-tool magazine on the headstock so as to be movable together with the latter and in providing this magazine in the form of an endless chain of single tools which is mounted on and movable relative to this support periodically for the required distances for carrying out the exchange operations within the period in which the tool in the working position of the toolhead carries out its work.

The aforementioned as well as additional features and advantages of the present invention will become more clearly apparent from the following detailed description thereof which is to be read with reference to the accompanying drawings, in which

FIG. 13 shows an enlarged top view of a part of the drilling unit and its single-tool magazine according to FIG. 12; while

Figure 1:
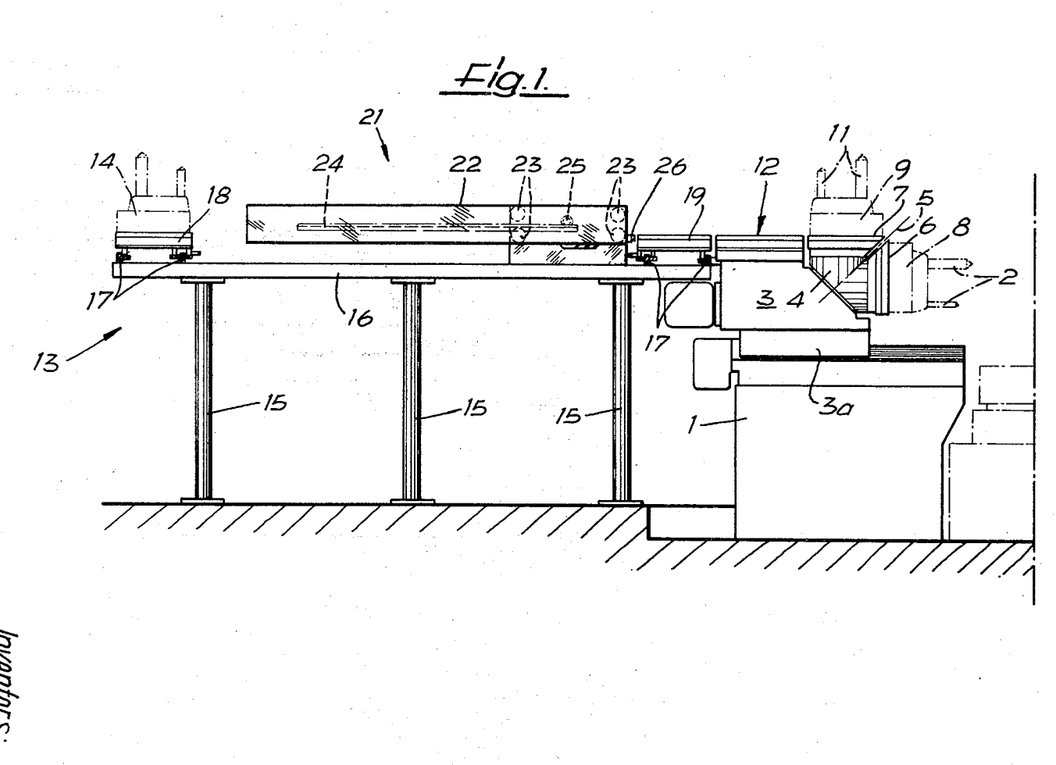
FIG. 1 shows partly in section, a side view of a drilling unit of a machine tool according to a first embodiment of the invention which is provided with exchangeable multiple-spindle drill heads and a magazine for these drill heads.
Figure 2:
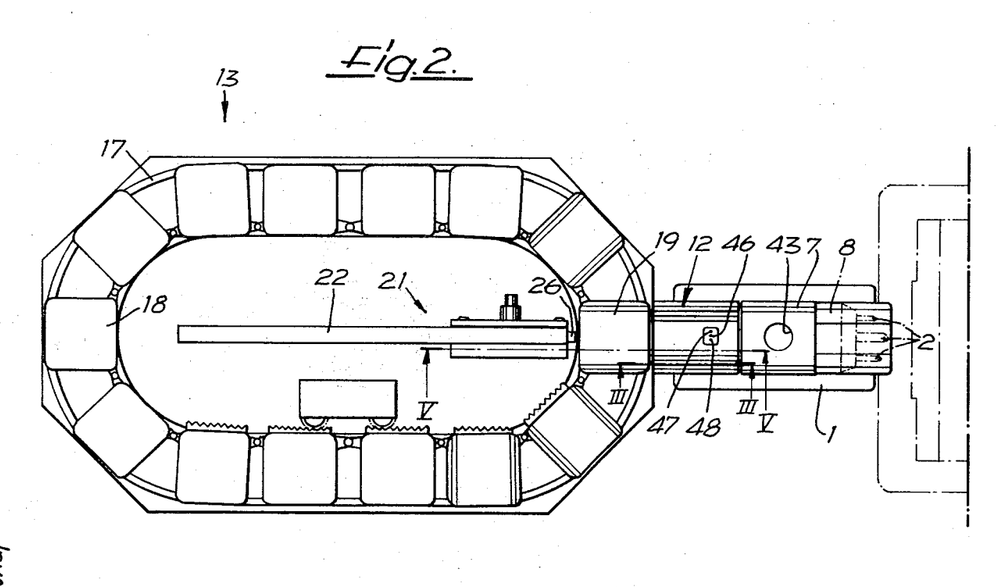
FIG. 2 shows a top view of the drilling unit according to FIG. 1.

Referring to the drawings and first particularly FIGS. 1 to 9 which illustrate a first embodiment of a part of a machine tool according to the invention, this machine is provided with a drilling unit which comprises a headstock 3 which by means of a carriage 3a is slidable back and forth along a solid stand or base 1 in the drilling direction of the tools 2. Headstock 3 carries a toolhead 4 which is mounted thereon so as to permit it to be turned about an axis 5 which is inclined at an angle of 45° to the mentioned drilling direction. Toolhead 4 is provided with two tool supports 6 and 7 with mounting surfaces which extend at an angle of 90° to each other and are each adapted for receiving a multiple-spindle drill head 8 or 9, respectively. Toolhead 4 is adapted to be turned 180° about its axis 5 to two positions and to be locked in these positions, in one of which as indicated in FIG. 1 the tool support 6 is in its working position and tool support 7 in an exchanging position, while in the other position of tool head 4, the positions of the two tool supports 6 and 7 are reversed. When in the exchanging position, tool support 7 is connected by a guide element 12, as illustrated in detail in FIGS. 3 and 4, to a magazine 13 for a plurality of multiple-spindle drill heads 14, only one of which is indicated in dot-and-dash lines at the left side of FIG. 1. Magazine 13 comprises a supporting frame 16 which is mounted on posts 15 and carries an endless rail track 17 along which an endless train of carriages 18 and 19 is intermittently movable, each of which is adapted to carry one drill head 14 on guide means which extend transversely to the direction of travel of the carriages on rails 17. When one of these carriages 19 is stopped in the exchange position of the magazine in which the transverse guide means of this carriage are located opposite to and in alignment with the guide rails 12, the respective drill head 14 may be moved laterally off its carriage 19 on rail track 17 and along the rails 12. The cycle of movements of the driving means (not shown) of this train of carriages 18, 19 along rail track 17 is adjustable and may be controlled by a suitable program control unit, not shown, so as either to move one carriage 19 after another to the exchange position of the magazine or to select at each time a particular carriage and move the train of carriages until the selected carriage 19 is in the exchange position in which the train is then stopped for the required length of time.

For exchanging the drill heads 14, the supporting frame 16 of the magazine also carries a shifting mechanism 21 which is adapted to move the drill heads off and on the respective carriage 18, 19 in the exchange position. This shifting mechanism 21 comprises a slide member 22 which is movable horizontally, for example, by being provided with guide rails, not shown, which are movable along rollers 23, which are merely indicated in dotted lines and are rotatably mounted in bearings in a manner not shown, for example, on brackets which are secured to the supporting frame 16. For shifting the slide member 22, it is provided with a rack 24 which is meshing with a pinion 25 which is likewise rotatably mounted on frame 16 and adapted to be driven by suitable driving means, not shown, the operation of which is likewise controlled by the mentioned program control unit for the driving means of the train of carriages 18, 19. The end of slide member 22 facing the headstock 3 is provided with a gripper 26 which is movable by suitable driving means, not shown, back and forth between a gripping position and a release position. In its gripping position the gripper 26 engages into a hook 27 on the drill head 28 which is supported on the particular carriage 19 which is in its exchange position, while in its release position, gripper 26 is lifted out of this hook 27.

Figure 3:
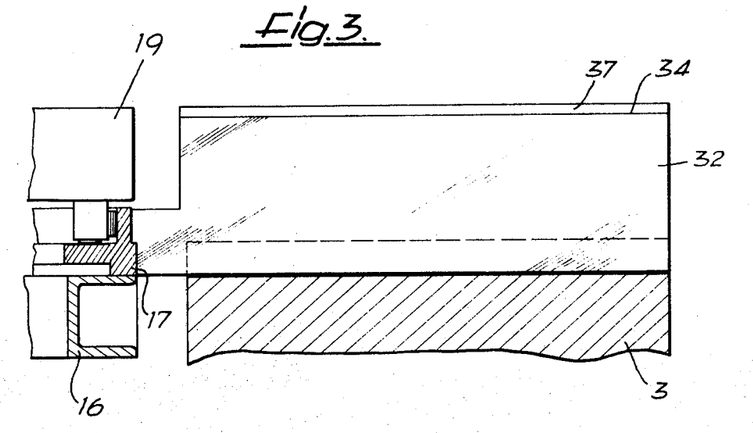
FIG. 3 shows an enlarged cross section which is taken along the line III — III of FIG. 2.
Figure 4:
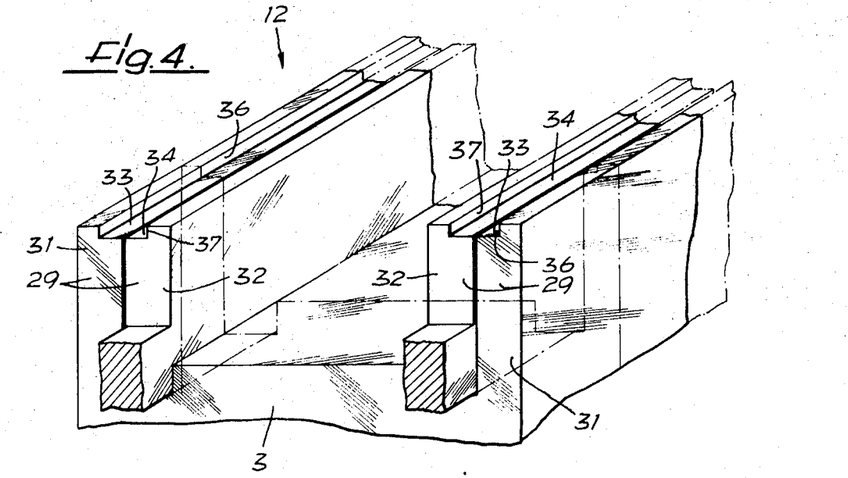
FIG. 4 shows a perspective view of the telescoping guide rails which connect the magazine with the drilling unit according to FIG. 1 and which are partly broken away and shown in section.
Figure 5:
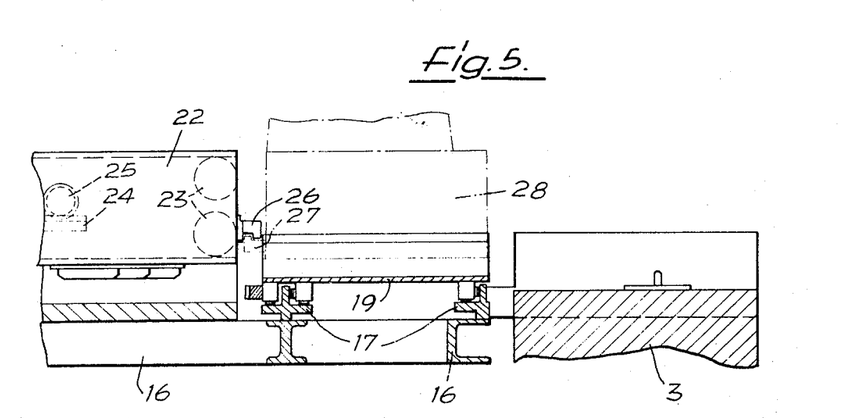
FIG. 5 shows a cross section which is taken along the line V — V of FIG. 2.

As illustrated particularly in FIGS. 3 and 4, the guide element 12 comprises a pair of parallel rails 29 which are spaced from each other and each of which is composed of two sections 31 and 32 which are disposed closely adjacent to and are slidable along each other. The two inner rail sections 32 of rails 29 are rigidly secured to the rails 17 of the rail track of magazine 13, while the two outer rail sections 31 are rigidly secured to the headstock 3. The two inner rail sections 32 are therefore telescopically slidable between and along the two outer rail sections 31. The upper sides of the two sections 31 and 32 of each rail 29 are provided with equal adjacent grooves 33 and 34 which together form a guide groove of a U-shaped cross section, and both of these guide grooves in the two rails 29 are adapted to receive and guide a pair of raillike guide members 35 on the lower side of a drill head 9, as indicated in dot-and-dash lines in FIG. 9. Since these guide members 35 engage at the same time in both rails 29 on both lateral walls 36 and 37 of both grooves 33 and 34, the drill head 9 will also be properly guided even if these guide members 35 only engage either with the inner rail sections 32 or with the outer rail sections 31.

Figure 8:
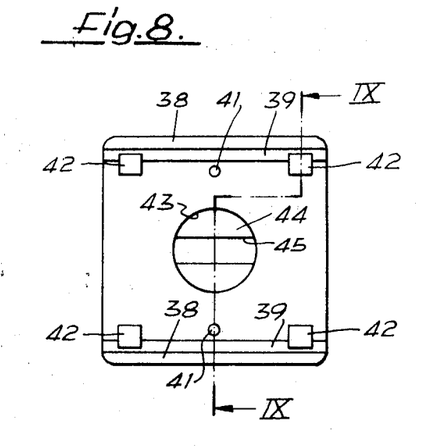
FIG. 8 shows a plan view of a tool support of the toolhead of the drilling unit according to FIGS. 1 to 5.
Figure 9:
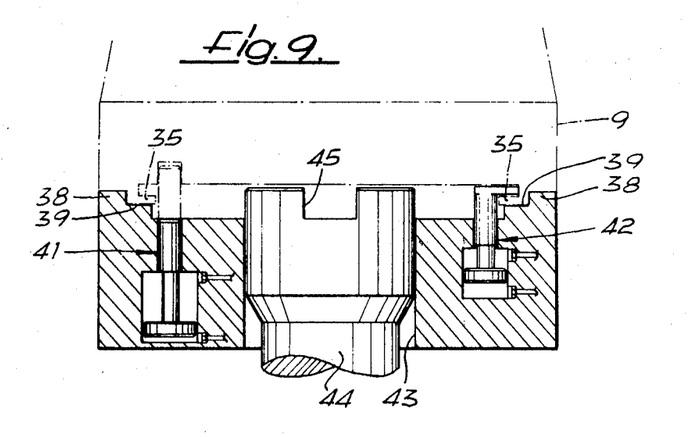
FIG. 9 shows a cross section which is taken along the line IX — IX of FIG. 8.

Both tool supports 6 and 7 of tool head 4 are identical and, as shown in FIGS. 8 and 9, they are provided with guide projections 38 which define inwardly open grooves 39 which correspond to the grooves 33 in the outer rail sections 31 and are adapted to guide the guide members 35. For accurately positioning a drill head 9 in tool support 7 after it has been inserted therein and for clamping it to the tool support 7, each of the two tool supports 6 and 7 is provided with index means 41 and clamping means 42 which are of a type known as such and the operations of which are likewise controlled by the program control unit as previously mentioned. Each tool support 6 and 7 has a central bore 43 for receiving a drive shaft 44 which is rotatably mounted in the toolhead 4 and the plane end surface of which facing the respective tool support is provided with a diametrically extending recess 45 into which a projection of a corresponding shape on the end of the drive shaft of one of the multiple-spindle drill heads 8 or 9 is adapted to engage. Drive shaft 44 of the respective tool support 6 or 7 which is in its working position, for example, that of the tool support 6 according to FIG. 1, is adapted to be connected by a clutch, not shown, to suitable driving means. For each of these two drive shafts 44 a control mechanism is provided which is of a known type and not shown in the drawings and adapted to disengage the driving clutch of shaft 44 when recess 45 is disposed in such a position that, when the tool support 6 or 7 is being moved to the exchanging position, this recess 45 extends in the direction in which the tool head 4 has to be moved in order to effect an exchange.

Figure 6:
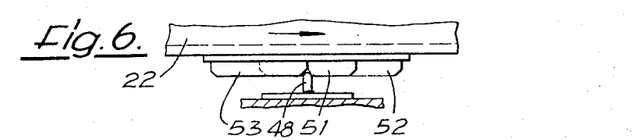
FIGS. 6 and 7 show respectively a side view and a top view of a sensing device for controlling the movements of the slide member of the magazine for the drilling unit according to FIGS. 1 to 5.
Figure 7:
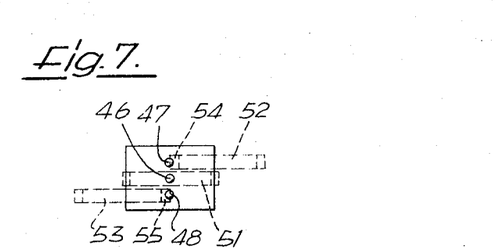

For preventing the occurrence of any impact upon the tool support 7 of tool head 4 when a new drill head 9 is being moved thereon, which would occur, for example, if a fixed end stop were provided against which this drill head would strike, guide element 12 is provided with a sensing or positioning device comprising three electric switches 46, 47 and 48, as shown particularly in FIGS. 6 and 7, which are connected to the drive means of drive pinion 25 and may be actuated by cams 51, 52 and 53, respectively, which are mounted on slide member 22. Switch 46 serves for the purpose of changing the high-speed movement of slide member 22 to a slow movement which continues until the accurate final position of drill head 9 has been found, while switches 47 and 48 are connected so that, if both of them are switched off, the forward movement of slide member 22 will be discontinued. The actuation of switch 47 alone has no effect, but if this switch 47 is switched off and switch 48 is then actuated, the forward movement of slide member 22 will be reversed and the latter will move back in slow motion. As indicated in FIG. 7, cams 51 to 53 are staggered relative to each other so that switch 47 will first be actuated by cam 52 which, however, will not as yet have any influence upon the movement of slide member 22 so that the latter will continue to move forwardly in rapid motion. Thereafter, switch 46 will be actuated by cam 51 with the result that the rapid motion of slide member 22 will be changed to a slow motion. Switch 46 then remains continuously switched on. Cam 52 has on its rear end a descending cam surface 54, while cam 53 has on its front end an ascending cam surface 55. These two cam surfaces 54 and 55 are disposed in relation to the actuating pins of switches 47 and 48 so that when slide member 22 has arrived in the desired position in which drill head 9 while being gripped by the gripper 26 on slide member 22 is located in the proper position on tool support 7, switch 47 will still be switched on, while switch 48 will just be switched on by the cam surface 55. In the event that slide member 22 will be moved slightly beyond its intended limit, for example, due to its inertia, switch 47 will be switched off and only switch 48 will be switched on which immediately causes slide member 22 to be moved back until switch 47 is switched on. If slide member 22 stops in this position, drill head 9 will be located in the desired position. If, however, slide member 22 also moves at this time slightly beyond its intended limit, switch 48 will be switched off so that drill head 9 will again be shifted forwardly. Slide member 22 therefore oscillates back and forth until it arrives in its desired end position without subjecting the tool head 4 to any mechanical impacts which would occur if the tool head would strike against any fixed stop member.

During the operation of the entire drilling unit, all parts thereof including the magazine 13 and the shifting mechanism 21 are controlled in a conventional manner by the program control unit as previously mentioned. When in this operation the headstock 3 carries out its working stroke, the drill head 9 which is located on tool support 7 in the exchanging position will be gripped by slide member 22 and, after the positioning and clamping means 41 and 42 are released from drill head 9, this drill head will be drawn from the tool support 7 via the guide element 12 upon the empty carriage 19 of magazine 13 which is located in the exchanging position. Gripper 26 of slide member 22 then disengages from drill head 9, whereupon the train of carriages 18 and 19 starts to move and continues to do so until the drill head which has been selected for the next exchange has arrived in the exchanging position of magazine 13. Slide member 22 will then shift this selected drill head 9 via the guide element 12 to the empty tool support 7 where the drill head after being properly positioned by the switches 47 and 48 and the index pins 41 is clamped upon the tool support 7 on tool head 4. These entire exchanging operations occur during the period in which the headstock 3 carries out a working stroke toward a workpiece at the right of FIG. 1 and then moves back to its original position. When this operation is completed, the drill heads 9 have also been exchanged in the tool support 7 so that tool head 4 may be turned at an angle of 180° about its inclined axis 5 and the newly selected drill head 9 will be in its operative position, while the drill head which has just completed its work may be exchanged for a new drill head in the manner as previously described.

The driving means, especially those for the movements of slide member 22, preferably are operated hydraulically in which case, for example, the return movement of slide member 22 may be simply limited by an end stop without requiring the driving means to be switched off at a very accurate moment since the hydraulic drive means also act as a resilient shock absorber at the end of this movement.

Figure 10:
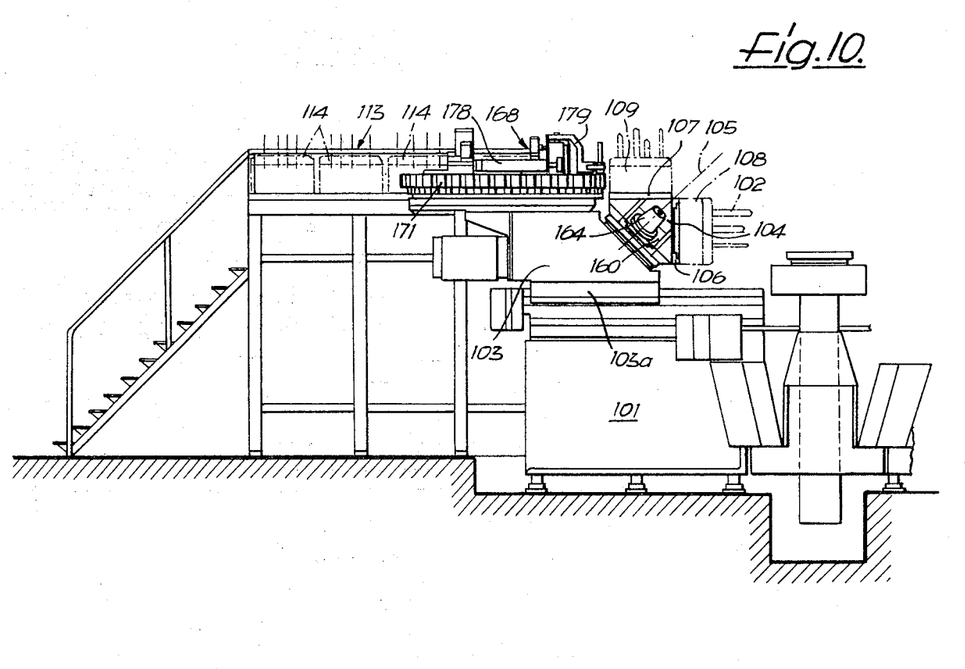
FIG. 10 shows a side view of a drilling unit of a machine tool according to a second embodiment of the invention which is provided with a magazine for multiple-spindle drill heads and with another magazine for individual tools, and in which the toolhead is equipped for its operation with multiple-spindle drill heads.
Figures 11, 12:
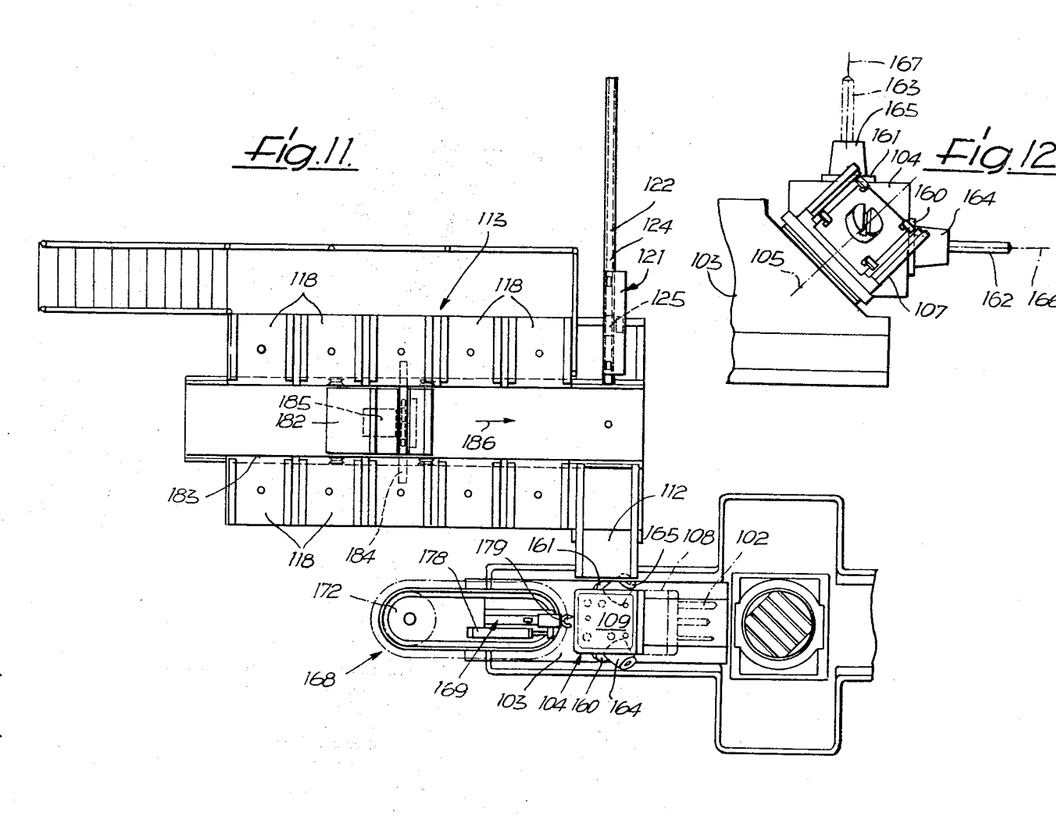
FIG. 11 shows a top view of the drilling unit and its magazines according to FIG. 10.
FIG. 12 shows a side view of a part of the drilling unit according to FIG. 10, but equipped for its operation with individual drill heads.

FIGS. 10 to 14 illustrate a drilling unit of a second embodiment of the machine tool according to the invention. This drilling unit comprises a solid stand or base 101 along which by means of a slide member 103a a headstock 103 is movable back and forth in the drilling direction of the tools 102. Headstock 103 carries a tool head 104 which is mounted thereon so as to permit it to be turned about an axis 105 which is inclined at an angle of 45° to the direction of movement of the headstock 103. Tool head 104 is provided with two tool supports 106 and 107 for mutliple-spindle drill heads 108 and 109, while between these tool supports 106 and 107 as seen in the direction in which tool head 104 is turned two further tool supports 160 and 161 are provided in positions diametrically opposite to each other. As illustrated in FIG. 12, each of these tool supports 160 and 161 is adapted to carry an individual drilling tool 162 and 163, respectively. The supporting plane of tool support 106 for the multiple-spindle head 108 extends at a right angle to the direction of movement of tools 102 and also at a right angle to the supporting plane of tool support 107 for the other multiple-spindle head 109 and this angle is bisected by the axis 105. Tool head 104 is adapted to be turned to four different positions about this axis 105 and to be locked in each of these positions in one of which, as illustrated in FIGS. 10 and 11, the tool support 106 is in its working position and tool support 107 in its exchanging position. When tool head 104 is turned 180° about its axis 105, these positions of tool supports 106 and 107 will be reserved. Therefore, when tool head 104 is turned so that either of the tool supports 106 and 107 is in the position in which tool head 104 is shown in FIGS. 10 and 11, the drilling unit will operate in a multiple-spindle operation, while when tool head 104 is turned 90° relative to either of these positions, one of the tool supports 160 or 161 will be in its working position so that the drilling unit will operate with an individual drilling tool while the other of these tool supports 160 or 161 will be in its exchanging position.

Each tool support 160 and 161 for the individual drilling tools 162 or 163 comprises a spindle head 164 or 165, respectively, which forms a part of one of the drive spindles (not shown) in tool head 104 either of which when turned to its operative position may be connected by suitable clutch means to the main spindle in the headstock 103. These spindle heads 164 and 165 project from the tool head 104 and, as shown in FIG. 12, their axes 166 and 167 are disposed at a right angle to each other and each of these axes extends at an angle of 45° to the axis 105 of tool head 105. The individual drilling tools 162 and 163 are adapted to be inserted into and locked to the spindle heads 164 and 165.

The tool supports 106 and 107 for the multiple-spindle heads 108 and 109, as shown in FIGS. 10 and 11, are of the same construction as those of the machine tool according to the first embodiment of the invention as shown in FIGS. 1 to 9. For the tool supports 160 and 161 for the individual drilling tools 162 and 163 a tool magazine 168 is provided which comprises a tool changing mechanism 169. Tool magazine 168 is mounted on the headstock 103 and is slidable with the latter, and its longitudinal axis extends in the direction of movement of headstock 103. For mounting the individual tools 162 and 163 on the tool supports 160 and 161, respectively, it is usually advisable first to remove the multiple-spindle heads 108 and 109 from their tool supports 106 and 107 since these spindle heads usually have a considerable weight and when remaining on the tool head 104 while the latter also carries the individual tools 162 and 163, the turning of the tool head and its stopping and locking in the respective positions would require an unnecessary amount of energy and cause unnecessary wear. Tool magazine 168 together with its tool changing mechanism 169 then permits the first individual tool to be supplied to and to be mounted on spindle head 164 while in its exchanging position, and by an appropriate turn of tool head 104 this tool may then be moved to its working position. Thereafter, while this tool carries out its working and return strokes by the movements of headstock 103, the other tool 163 may be exchanged for a new tool from magazine 168.

Figure 13:
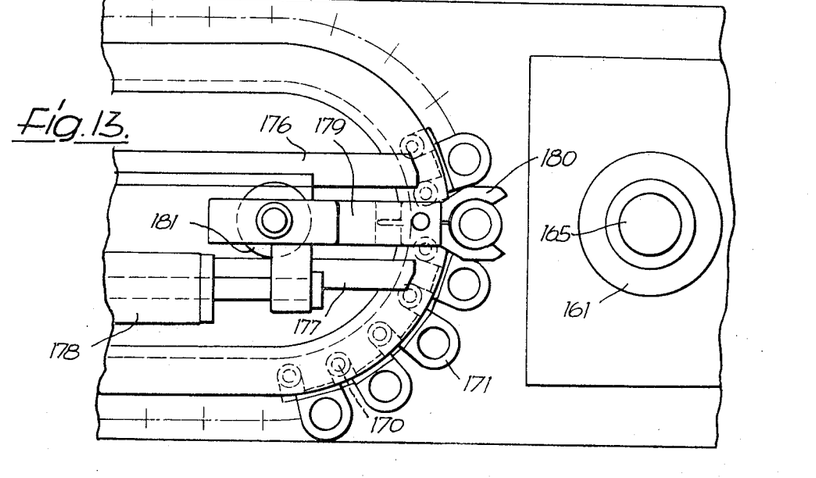
Figure 14:
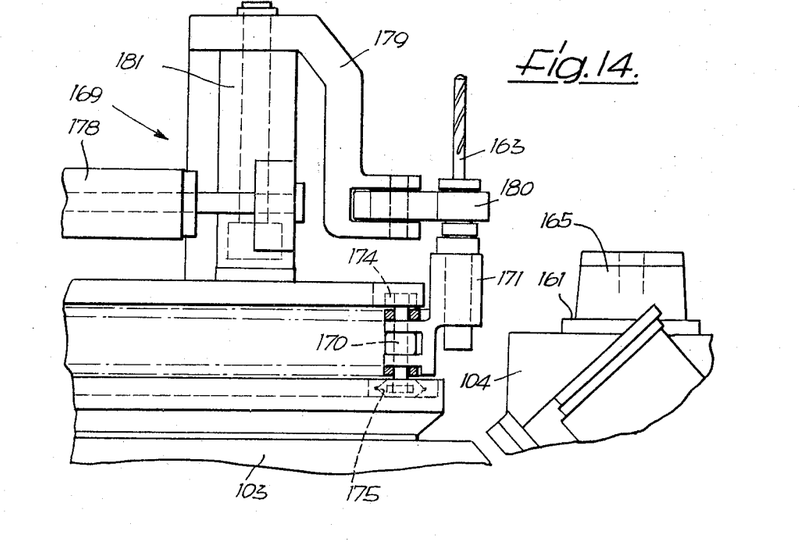
FIG. 14 shows, partly in section, a side view of the part of the drilling unit and single-tool magazine as shown in FIG. 13.

As illustrated in greater detail in FIGS. 13 and 14, tool maazine 168 comprises a plurality of sockets 171 each of which contains an individual tool 163 and is pivotably connected by pivot pins 170 to the adjacent sockets. These sockets 171 of magazine 168 together form an endless oval chain or train which is moved by a gear wheel 172 (FIG. 11) which meshes with the pivot pins 170 and is driven by a drive mechanism, not shown, the operation of which may be controlled, for example, by the program control unit of the machine. At their upper and lower ends, pivot pins 170 are provided with guide rollers 174 which are slidable within and along upper and lower oval guide tracks 175. The tool changing mechanism 169 is provided with a gripper arm 179 which is movable in the direction of movement of headstock 103 and relative to the latter between and along guide rails 176 and 177 by means of a hydraulic or pneumatic drive unit 178. On its free end this arm 179 is provided with a clawlike gripper 180 which is adapted to grip one of the individual tools 163. Gripper arm 179 is further movable up and down in a vertical direction by means of another pneumatic or hydraulic drive unit 181.

If the tool 163 is to be inserted into the spindle head 165 of tool head 4, the gripper arm 179 is lifted by means of the drive unit 181 the operation of which may be controlled, for example, by the program control unit, so that tool 163 will be lifted out of the magazine socket 171 and will thereafter be moved together with the drive unit 181 by the other drive unit 178 along the guide rails 176 and 177 so far in the direction toward the spindle head 165 that, when the gripper arm 179 is subsequently lowered by means of the drive unit 181, tool 163 will be inserted into the spindle head 165.

At one lateral side of the drilling unit a second magazine 113 is mounted for a plurality of individual multiple-spindle heads 114, as indicated in dotted lines in FIG. 10. This magazine 113 comprises two parallel rows of supports 118 which are spaced from each other and extend parallel to the direction of movement of the headstock 103. Each of these supports 118 is adapted to hold one multiple-spindle head 114. Between the two rows of supports 118 the magazine is provided with a carriage 182 which is movable on rails 183 and the upper surface of which is disposed within the plane of the upper surfaces of the supports 118. Underneath this plane, carriage 182 is provided with a slide member 184 which is movable by suitable driving means, not shown, in a direction transverse to the direction of rails 183. In addition, slide member 184 is also pivotable about an axis extending parallel to the direction of rails 183. Carriage 182 is movable along rails 183 by means of a drive mechanism 185 the operation of which may be controlled, for example, by the program control unit, not shown. If carriage 182 is located between two opposite supports 118 in a position as indicated in FIG. 11, a multiple-spindle head resting on one of these supports may be gripped by the slide member 184 which for this purpose is shifted to a position underneath the respective support 118 and the multiple-spindle head thereon. When the slide member is then pivoted so that, for example, a hook on its upwardly pivoted end will engage into an aperture in the spindle head, slide member 184 will again be retracted so that the spindle head will be drawn upon the upper surface of carriage 182. The carriage is then moved in the direction of the arrow 186 up to its end position. For the further transverse movement of the spindle head 114 off the carriage 182 while stopped in this end position, magazine 113 is further provided with another slide mechanism 121, as shown in FIG. 11, which comprises a slide member 122 which is movable transversely to the direction of movement of the headstock 103 by being provided with a rack 124 which meshes with a pinion 125 which may be driven by suitable driving means the operation of which may likewise be controlled by the program control unit.

In the following description of the operation of the machine tool according to the second embodiment of the invention it is assumed that the drilling unit is at first in the position as illustrated in FIG. 10, in which the tool head 104 is turned to and locked in such a position that the tool support 106 carrying the multiple-spindle head 108 is in its working position. After the tools 102 have carried out their work on the workpiece, not shown, the headstock 103 is retracted and the newly selected multiple-spindle head 109 is moved by the slide member 122 into the tool support 107.

The selection of the particular multiple-spindle head 109 which is next to be employed proceeds in such a manner that the position of its support 118 in magazine 113 is selected by the program control unit of the machine, whereupon the drive mechanism 185 moves the carriage 182 along the rails 183 to the position in registry with the selected support 118 so that the spindle head 109 on the latter may be drawn off this support and upon the carriage 182. Thereafter carriage 182 is moved to the position between and in registry with the slide memeber 122 and a stationary rail track 112, whereupon the selected spindle head 109 is inserted into the tool support 107.

After this multiple-spindle head 109 has been locked in its proper position in tool support 107, tool head 104 is turned 180° about its axis 105. Headstock 103 will then be in its retracted position, tool support 107 in its working position and tool support 106 in its exchanging position. The multiple spindle head 108 which has been employed for the last drilling operation is then gripped by slide member 122 and withdrawn by the latter from tool support 106 along rail track 112 and upon carriage 182 which is waiting in its end position in magazine 113. After the removal of spindle head 108 from tool support 106, headstock 103 is again moved forwardly so that the new multiple spindle head 109 may carry out its working stroke. In the meantime, spindle head 108 is carried back by carriage 182 and slide member 184 to the respective support 118 of magazine 113 in which it was originally located, whereupon a new multiple-spindle head is selected in magazine 113 and moved by carriage 182 to the end position of the latter for being moved by slide member 122 to the empty tool support 107 or 108 when headstock 103 has been retracted to its original position.

If after a multiple-spindle operation according to FIGS. 10 and 11 a single-spindle operation according to FIG. 12 is to be carried out, both multiple-spindle heads 108 and 109 are at first removed from the associated tool supports 106 and 107 in the manner as previously described and while the headstock 103 is in its retracted position. Tool head 104 is then turned 90° about its axis 105 so that, for example, the spindle head 165 will be located in the exchanging position. The driving mechanism of magazine 168 which is preferably controlled by the mentioned program control unit (not shown) then moves this magazine so that the preselected drilling tool 163 will be moved to the position in accordance with FIG. 14 and will then be gripped by the gripper arm 179 and inserted into the spindle head 165. Tool head 104 is then turned 180° about its axis 105 so that spindle head 165 with tool 163 will be moved to its working position. Headstock 103 may then be moved forwardly to carry out the individual drilling operation, while in the meantime the other drilling tool 162 is inserted by the tool changing mechanism 169 of magazine 168 into the other spindle head 164 which is then in its exchanging position.

Although our invention has been illustrated and described with reference to the preferred embodiments thereof in the form of drilling units, we wish to have it understood that it is in no way limited to these embodiments and the details thereof, but is capable of numerous modifications within the scope of the appended claims and may also be employed for automatically exchanging other kinds of tool heads and tools, for example, for tapping, turning, milling or other operations.

Having thus fully disclosed our invention, what we claim is:

1. A tool-exchanging mechanism for a machine tool having a base, a headstock slidable along said base, and driving means for reciprocating said headstock in a working direction so as to carry out a working stroke and in the opposite direction to carry out a return stroke, said tool-exchanging mechanism comprising a tool head mounted on and rotatably connected to said headstock and having an axis of rotation extending at an angle with respect to the direction of movement of said headstock, said tool head having at least two tool supports, each of said tool supports having a supporting face adapted to be connected with one of a plurality of multiple spindle heads, said supporting faces extending at equal angles to said axis of rotation and arranged at equal angles about said axis, means for alternately turning said tool head about said axis of rotation from one to the other of at least two positions and for releasably locking said tool head in each of these positions, one of said supporting faces being in a working position and the other of said supporting faces being in an exchanging position, said tool-exchanging mechanism further comprising a magazine containing said plurality of multiple spindle heads, guide means connecting said magazine to said tool support with said supporting face in said exchanging positions, shifting means for moving said spindle head from said supporting face in said exchanging position via said guide means to said magazine and for moving another of said multiple spindle heads from said magazine to said supporting face in said exchanging position, and means for driving said shifting means.

2. A tool exchanging mechanism as defined in claim 1, in which said driving means for said shifting means are fluid-operated.

3. A tool exchanging mechanism as defined in claim 1, further comprising a sensing device, and means on said shifting means operatively associated with said sensing device for resiliently determining the proper position of one of said multiple spindle heads on a supporting face in said exchanging position at the end of the movement of said shifting means when moving said spindle head from said magazine toward and upon said tool head.

4. A tool exchanging mechanism as defined in claim 3, in which said sensing device comprises at least two switches mounted in fixed positions and connected to said driving means, said associated means comprising at least two cam projections on said shifting means having oppositely inclined cam surfaces extending in the direction of movement of said shifting means and adapted alternately to engage with and actuate said switches for at least once reversing the movements of said driving means for a short time and distance when said shifting means have moved said spindle head slightly beyond said proper position and for then switching off said driving means when said spindle head is in said proper position.

5. A tool exchanging mechanism as defined in claim 1, in which said magazine for said multiple-spindle heads comprises an endless rail track and an endless train of carriages movable along said rail track and each being adapted to carry one of said spindle heads, and means for stopping said train when one of said carriages is in an exchanging position in alignment with a supporting face in its exchanging position so that said shifting means may then shift one of said spindle heads from said supporting face upon said carriage and vice versa.

6. A tool exchanging mechanism as defined in claim 1, in which said guide means comprise two rails equally spaced from each other, each of said rails consisting of a pair of inner rail sections and a pair of outer rail sections, said inner sections being telescopically slidable along said outer sections, one of said pairs being rigidly connected to said headstock and the other pair to said magazine.

7. A tool exchanging mechanism as defined in claim 6, in which said inner and outer rail sections of each rail are closely adjacent to each other, each of said multiple-spindle heads having guide means adapted to engage with and slide at least along said pair of said inner rail sections or said pair of outer rail sections, respectively.

8. A tool exchanging mechanism as defined in claim 1, further comprising a separate drive shaft rotatably mounted in said tool head for each of said tool supports for said multiple-spindle heads, each of said drive shafts having a recess in one end and each of said spindle heads having a projection adapted to engage into said recess in one of said shafts when said spindle head is moved to said exchanging position, drive means, and means for connecting said shaft for said spindle head located in said working position to said drive means and for disconnecting said shaft for said spindle head in said exchanging position from said drive means.

9. A tool-exchanging mechanism as defined in claim 1, further comprising a second magazine containing a plurality of individual tools, and wherein said tool head comprises at least four tool supports, each of at least two of said tool supports being adapted to receive an individual tool, means for selecting one of said individual tools in said second magazine and for moving the same to an exchanging position of said second magazine, and tool-exchanging means for exchanging said selected tool for an individual tool on a tool support which is located in the exchanging position of said tool head.

10. A tool exchanging mechanism as defined in claim 9, in which each of said tool supports for an individual tool is located in a position intermediate two adjacent tool supports for multiple-spindle heads, as seen in the direction in which said tool head is turned about its axis.

11. A tool exchanging mechanism as defined in claim 10, further comprising means for turning said tool head about its axis so as alternately to move any tool support carrying a multiple-spindle head and any tool support carrying an individual tool to said working position.

12. A tool-exchanging mechanism as defined in claim 9, in which said two tool supports for individual tools, on the one hand, and said two tool supports for said multiple spindle heads, on the other hand, each are located in diametrically opposite positions on said tool head.

13. A tool exchanging mechanism as defined in claim 9, in which said second magazine is mounted on and movable with said headstock and forms an endless chain of individual tool carriers.

14. A tool exchanging mechanism as defined in claim 13, in which said second magazine has a substantially oval shape having a longitudinal axis extending in the direction of movement of said headstock.

15. A tool-exchanging mechanism as defined in claim 14, in which said first magazine containing a plurality of said multiple-spindle heads is located laterally of said second magazine for said individual tools, and shifting means associated with said first magazine and movable in a direction at right angles to the direction of movement of said headstock for exchanging a multiple-spindle head on a tool support in its exchanging position on said tool head for one of said spindle heads of said first magazine.

16. A tool exchanging mechanism as defined in claim 15, in which said first magazine is elongated and has a longitudinal axis extending parallel to the direction of movement of said headstock.

17. A tool-exchanging mechanism as defined in claim 1, wherein the axis of rotation of the tool head extends at an angle of 45° with respect to the direction of movement of the headstock.

* * * * *